United States Patent

O'Hara

[11] 4,346,866
[45] Aug. 31, 1982

[54] HANDY HANGER MOLDING CLIP

[76] Inventor: John W. O'Hara, 10466 Sunset Ter., Des Moines, Iowa 50322

[21] Appl. No.: 144,575

[22] Filed: Apr. 28, 1980

[51] Int. Cl.³ .............................................. A47F 5/00
[52] U.S. Cl. .................................. 248/316 B; 24/253; 24/255 R
[58] Field of Search .......... 248/316 R, 316 D, 316 B; 24/259 R, 260, 255 R, 252 R, 253, 84 R, 84 B; 211/89; 224/230, 277, 311, 323

[56] References Cited

U.S. PATENT DOCUMENTS

| 885,026 | 4/1908 | Dodge | 211/89 UX |
| 2,988,252 | 6/1961 | Crane | 224/311 |
| 3,295,235 | 1/1967 | Tauber | 224/230 X |
| 3,371,829 | 3/1968 | Phillips | 224/230 |
| 3,672,622 | 6/1972 | Breslow | 248/224.4 |
| 3,881,676 | 5/1975 | Reinwall | 248/224.4 |

FOREIGN PATENT DOCUMENTS 7283 5/1932 Australia .......................... 24/252 R Primary Examiner—J. Franklin Foss
Attorney, Agent, or Firm—Henderson & Sturm

[57] ABSTRACT

This invention relates to removeable article support devices in general, and more specifically to a resilient article support device which is designed to cooperate with an interior car molding, to provide a moveable article support, which can be positioned at the location of greatest convenience for the particular end user.

3 Claims, 4 Drawing Figures

U.S. Patent      Aug. 31, 1982      4,346,866
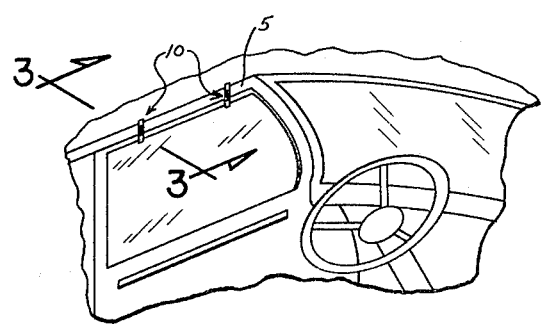
FIG.1
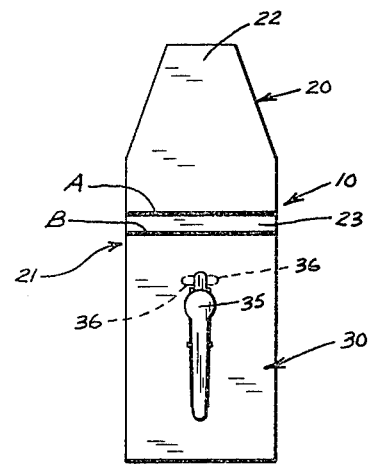
FIG.2
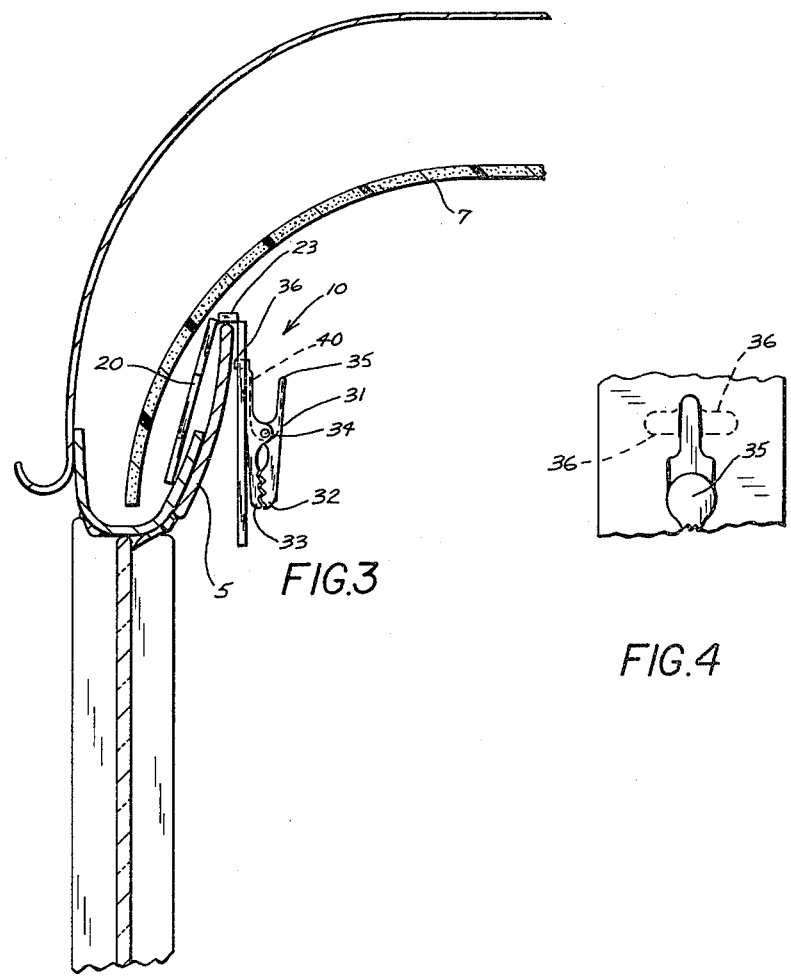
FIG.3
FIG.4

HANDY HANGER MOLDING CLIP

BACKGROUND OF THE INVENTION

Anyone who has ever driven or has been a passenger in a motor vehicle realizes that despite the various console designs and regardless of the glove compartment capacity, there never seems to be adequate provision for supports or containers which will hold small articles, which the vehicle occupant requires convenient and ready access to.

While small article holders are well known in the art, as is evidenced by reference to U.S. Pat. Nos.; 928,006; 275,581; 2,107,693 and 2,789,782, there has not been developed to date, a small article holder which has not been deficient in one respect or another.

Most of the prior art devices have been bulky, complex, expensive to manufacture, inappropriate for installation in a motor vehicle, rigid and inflexible, difficult to store when not in use, and have surfaces and projections which tend to snag on clothing, to name but a few of the drawbacks inherent in the structures currently available.

There has been a long felt need for a removable small article support device which is simple, inexpensive, efficient, has a low profile, and which will further overcome all of the objections to the prior art devices. The device which accomplishes these objectives, forms the basis for the instant invention.

SUMMARY OF THE INVENTION

An object of the present invention is the provision of a small article support device, which has only two components, and therefore simple and inexpensive to manufacture.

Another object of the instant invention is the provision of a small article support device, which is compact, has a low profile, and which will not snag on clothes, or otherwise impede the operator of a motor vehicle in which it is installed.

A further object of the invention is the provision of a flexible small article support device, which will mount flush on the interior of a motor vehicle, yet has one component adapted for articulated movement into a flat position for storage.

Still another object of the present invention is the provision of a small article support device, which is designed to cooperate with the molding of a motor vehicle interior, to removably and releasably, support and suspend, a small or lightweight article at a variety of locations within the motor vehicle interior at the option of the user.

Yet another object of the instant invention is the provision of a handy hanger molding clip, which will avoid all of the problems inherent in the prior art devices, and which will accomplish all of the objectives enumerated supra.

These and other objects, advantages and novel features of the invention will become apparent from the following detailed description of the invention when considered in conjunction with the accompanying drawings.

BRIEF DESCRIPTION OF THE DRAWINGS

FIG. 1 is a perspective view of the handy hanger molding clip as it would appear mounted on the interior of a motor vehicle.

FIG. 2 is a front plan view of the handy hanger molding clip prior to installation.

FIG. 3 is a cross-sectional view taken through line 3—3 of FIG. 1 illustrating the cooperation of the device with the interior molding.

FIG. 4 is a detailed view of the inter-engagement of the clip component with the articulated support component.

DETAILED DESCRIPTION OF THE PREFERRED EMBODIMENT

FIG. 1 shows the small article support device of the instant invention, designated generally as 10, installed in a motor vehicle interior 1, via cooperation with a molding strip 5.

The handy hanger molding clip 10 comprises two main components; a mounting component 20, and a clip component 30. As can be seen in FIG. 2, the mounting component 20 comprises the upper portion of an elongated strip 21 of plastic or similar material while the clip component 30 comprises the lower portion of the strip 21. The mounting component 20 of the elongated strip 21 is resilient and terminates in a tapered tab portion 22. The strip 21 is provided with a plurality of parallel slits A and B across its width. While these slits, or score lines, A and B penetrate the thickness of the strip 21 to a predetermined depth, they do not provide complete penetration of the material.

The clip component 30 is secured to the mounting component 20, at the score lines A and B which form a hinged connection between the components 20, 30. The clip component 30, in the preferred embodiment illustrated, includes an alligator clip 31 of standard configuration having upper and lower jaw members, 32 and 33 respectively, pivotally connected as at 34, and normally spring biased to a closed position by spring 40.

The upper jaw member 32 is shorter in length than the lower jaw member 33, and is provided with an enlarged rearwardly projecting actuating element 35, which may be depressed to overcome the spring bias, to force the jaw members 32 and 33 apart. The lower jaw member 33 is provided with a pair of ear elements 36, whose normal purpose and function in clamping an electrical lead as is well recognized.

In the instant invention; however, the ear elements 36 perform an entirely different function, in that they are bent away from the actuating element 35, and are inserted through strip 21. They are then bent outwardly to the position depicted in FIG. 4, thereby securing the clip 31 to the clip component 30 of strip 21.

The installation of the device 10 proceeds as follows. The vehicle interior has a molding strip 5 secured about the perimeter of the vehicle ceiling 7 as shown in FIG. 3. Ceiling 7 is typically comprised of a fabric material. The resilient mounting component 20 is inserted between the molding strip 5 and ceiling 7 as shown in FIG. 3. The component 20 is deformable to facilitate its insertion between molding 5 and ceiling 7 and can assume a curved posture if necessary. With mounting component 20 secured behind the molding 5, score lines A and B form a hinge element 23, which allows the clip portion 30 to be pivoted with respect to the mounting portion 20.

Once the handy hanger molding clip 10 is installed, a small article may be supported and suspended by the device, by depressing the actuating element 35 to force the jaw members 32 and 33 apart, inserting a portion of the article between the jaws, and releasing the actuating element 35.

Since alligator clips and plastic sheets are stock items from most suppliers, the components employed in the construction of the device 10 are readily available and relatively inexpensive. To manufacture the item only requires cutting and scoring the plastic into the configuration shown in FIG. 2, and securing the clip component thereto. The device 10 is therefore simple, inexpensive, easily manufactured, utilitarian, and accomplishes all of the objectives stated supra. It should further be recognized that the clip component employed does not have to be restricted to alligator clips but may be any suitable clip, clamp or fastening means.

While the clip 10 is shown in FIGS. 1 and 3 secured to the ceiling molding 5 it is noted that it could be secured to a molding adjacent to the driver's seat, for example, such as for holding a map, travel directions, or some other item. It is, thus, intended to be appreciated that the clip could be secured behind any suitable molding. As one type of installation, FIG. 1 shows pair of clips 10 secured behind the ceiling molding 5 to secure a suitably sized shade across the window such as for blocking sunlight, to provide privacy, or to serve some other purpose. Other variations in installation would, of course, be obvious.

Having thus disclosed the subject matter of this invention, it should be obvious that many modifications, substitutions and variations of the invention are possible in light of the above teachings. It is therefore to be understood, that the invention may be practiced other than as specifically described and should be limited only by the breadth and scope of the appended claims.

What I claim is:

1. A hanger molding clip for use in a vehicle having a deformable headliner ceiling and a molding strip around the perimeter of said ceiling and adjacent thereto; said clip comprising:

fastening means for manually selectively fastening objects thereto, said fastening means including an alligator clip;

a fastener component means for attachment to said fastening means;

a resilient mounting component means for being deformably placed between said headliner ceiling and said molding strip for securement to said vehicle;

hinge means for hingably connecting said fastener component means to said mounting component means, said hinge means comprising a plurality of parallel score lines which partially penetrate the thickness of said resilient mounting component means; and wherein said fastener component means, mounting component means and hinge means is of integral, one piece construction.

2. A handy hanger molding clip as in claim 1, wherein: said mounting component means has a tapered end.

3. The handy hanger molding clip as in claim 1, wherein: said resilient mounting component means is plastic.

* * * * *